US012786049B2

(12) United States Patent
Chatterjee et al.

(10) Patent No.: US 12,786,049 B2
(45) Date of Patent: Nov. 3, 2026

(54) SYSTEM AND METHOD FOR MANAGING LIFECYCLES OF NETWORK FUNCTIONS IN MULTIPLE CLOUD ENVIRONMENTS USING DECLARATIVE REQUESTS

(71) Applicant: VMWARE, INC., Palo Alto, CA (US)

(72) Inventors: Debankur Chatterjee, Bangalore (IN); Venu Gopala Rao Kotha, Bangalore (IN); Gurivi Reddy Gopireddy, Bangalore (IN); Sachin Bendigeri, Bagnalore (IN); Paarth Dassani, Bangalore (IN)

(73) Assignee: VMware LLC, Palo Alto, CA (US)

( * ) Notice: Subject to any disclaimer, the term of this patent is extended or adjusted under 35 U.S.C. 154(b) by 587 days.

(21) Appl. No.: 18/138,153

(22) Filed: Apr. 24, 2023

(65) Prior Publication Data

US 2024/0256316 A1 Aug. 1, 2024

(30) Foreign Application Priority Data

Jan. 27, 2023 (IN) ............................ 202341005468

(51) Int. Cl.
*H04L 41/08* (2022.01)
*G06F 9/455* (2018.01)
*H04L 41/50* (2022.01)

(52) U.S. Cl.
CPC .......... *H04L 41/08* (2013.01); *G06F 9/45558* (2013.01); *H04L 41/50* (2013.01); *G06F 2009/4557* (2013.01); *G06F 2009/45595* (2013.01)

(58) Field of Classification Search
CPC ................. G06F 9/45558; G06F 9/505; G06F 2009/4557; G06F 2009/45595; H04L 41/342; H04L 41/08; H04L 41/50
USPC .............................................................. 718/1
See application file for complete search history.

(56) References Cited

U.S. PATENT DOCUMENTS

| | | | | |
|---|---|---|---|---|
| 10,761,896 | B2 * | 9/2020 | Tsai | G06F 9/5077 |
| 11,122,129 | B2 * | 9/2021 | Friedman | H04L 12/1403 |
| 12,079,519 | B2 * | 9/2024 | Hasti | G06F 3/067 |
| 2018/0329952 | A1 * | 11/2018 | Ramachandra | G06F 16/90335 |
| 2021/0326162 | A1 * | 10/2021 | Melkild | G06F 9/45516 |
| 2022/0035650 | A1 * | 2/2022 | Banerjee | H04L 12/4641 |

OTHER PUBLICATIONS

B. Yi, X. Wang, M. Huang, and K. Li, "Design and implementation of network-aware VNF migration mechanism," IEEE Access, vol. 8, pp. 44346-44358, 2020 (Year: 2020).*

* cited by examiner

*Primary Examiner* — Jacob D Dascomb
(74) *Attorney, Agent, or Firm* — King Intellectual Asset Management

(57) ABSTRACT

A system and computer-implemented method for managing lifecycles of network functions in multiple cloud environments uses declarative requests to execute lifecycle management operations for network functions running in the multiple cloud environments, which have been transformed from imperative requests to execute the lifecycle management operation at a declarative service. Execution of the lifecycle management operations at the multiple cloud environments are managed from a central network function lifecycle orchestrator based on the declarative requests.

20 Claims, 12 Drawing Sheets

SYSTEM AND METHOD FOR MANAGING LIFECYCLES OF NETWORK FUNCTIONS IN MULTIPLE CLOUD ENVIRONMENTS USING DECLARATIVE REQUESTS

RELATED APPLICATIONS

Benefit is claimed under 35 U.S.C. 119(a)-(d) to Foreign Application Serial No. 202341005468 filed in India entitled "SYSTEM AND METHOD FOR MANAGING LIFECYCLES OF NETWORK FUNCTIONS IN MULTIPLE CLOUD ENVIRONMENTS USING DECLARATIVE REQUESTS", on Jan. 27, 2023, by VMware, Inc., which is herein incorporated in its entirety by reference for all purposes.

BACKGROUND

With fifth generation (5G) of wireless technology for telecommunications mandating low latency and certain edge processing capabilities, numerous edge/cell sites need to be brought up by telecommunications company (telco) vendors as part of their 5G roll out, which presents real challenges for telco providers. Orchestrators are chosen to fill the gap in provisioning these cell sites, bringing up virtual network functions (VNFs), and managing and monitoring them.

Cloud-native principles and technology have proven to be an effective acceleration technology in building and continuously operating the largest clouds in the world. Cloud-native applications enable users to specify their intents about resources and strive to maintain the application resources in user intended way. These principles need no user intervention to maintain these resources. For example, if a VNF goes to a bad state, the cloud-native principles strive to bring the VNF back to the intended state without any manual intervention from the user. This new technology has been selected by various business organizations in the telecommunications industry to develop the next-generation VNFs called cloud-native network functions (CNFs). These CNFs, when running inside telecommunications premises, form a private cloud, and the same public cloud principles can be effectively used. CNFs cover all branches of the service provider market, including cable, mobile, video, security, and network infrastructure.

Upgrades of VNFs to CNFs, when done properly, can increase flexibility and eliminate hardware dependencies. However, there are many limitations in that VNF upgrades are slow, restarts take a long time, command line interface (CLI) is still the main interface, software is typically a lift and shift operations, hypervisors to run VNFs/CNFs are hard to install, there is little elasticity, and scaling is problematic.

SUMMARY

A system and computer-implemented method for managing lifecycles of network functions in multiple cloud environments uses declarative requests to execute lifecycle management operations for network functions running in the multiple cloud environments, which have been transformed from imperative requests to execute the lifecycle management operation at a declarative service. Execution of the lifecycle management operations at the multiple cloud environments are managed from a central network function lifecycle orchestrator based on the declarative requests.

A computer-implemented method for managing lifecycles of network functions in multiple cloud environments in accordance with an embodiment of the invention comprises receiving imperative requests to execute lifecycle management operations for the network functions running in the multiple cloud environments at a declarative service, transforming the imperative requests to execute the lifecycle management operations into declarative requests to execute the lifecycle management operations at the declarative service, and managing executions of the lifecycle management operations at the multiple cloud environments from a central network function lifecycle orchestrator based on the declarative requests to execute the lifecycle management operations. In some embodiments, the steps of this method are performed when program instructions contained in a non-transitory computer-readable storage medium are executed by one or more processors.

A system in accordance with an embodiment of the invention comprises memory and at least one processor configured to receive imperative requests to execute lifecycle management operations for network functions running in multiple cloud environments at a declarative service, transform the imperative requests to execute the lifecycle management operations into declarative requests to execute the lifecycle management operations at the declarative service, and manage executions of the lifecycle management operations at the multiple cloud environments from a central network function lifecycle orchestrator based on the declarative requests to execute the lifecycle management operations.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

The embodiments of the invention are illustrated by way of example, and not by way of limitation, in the figures of the accompanying drawings in which.

Throughout the description, similar reference numbers may be used to identify similar elements.

DETAILED DESCRIPTION

Figure 1:
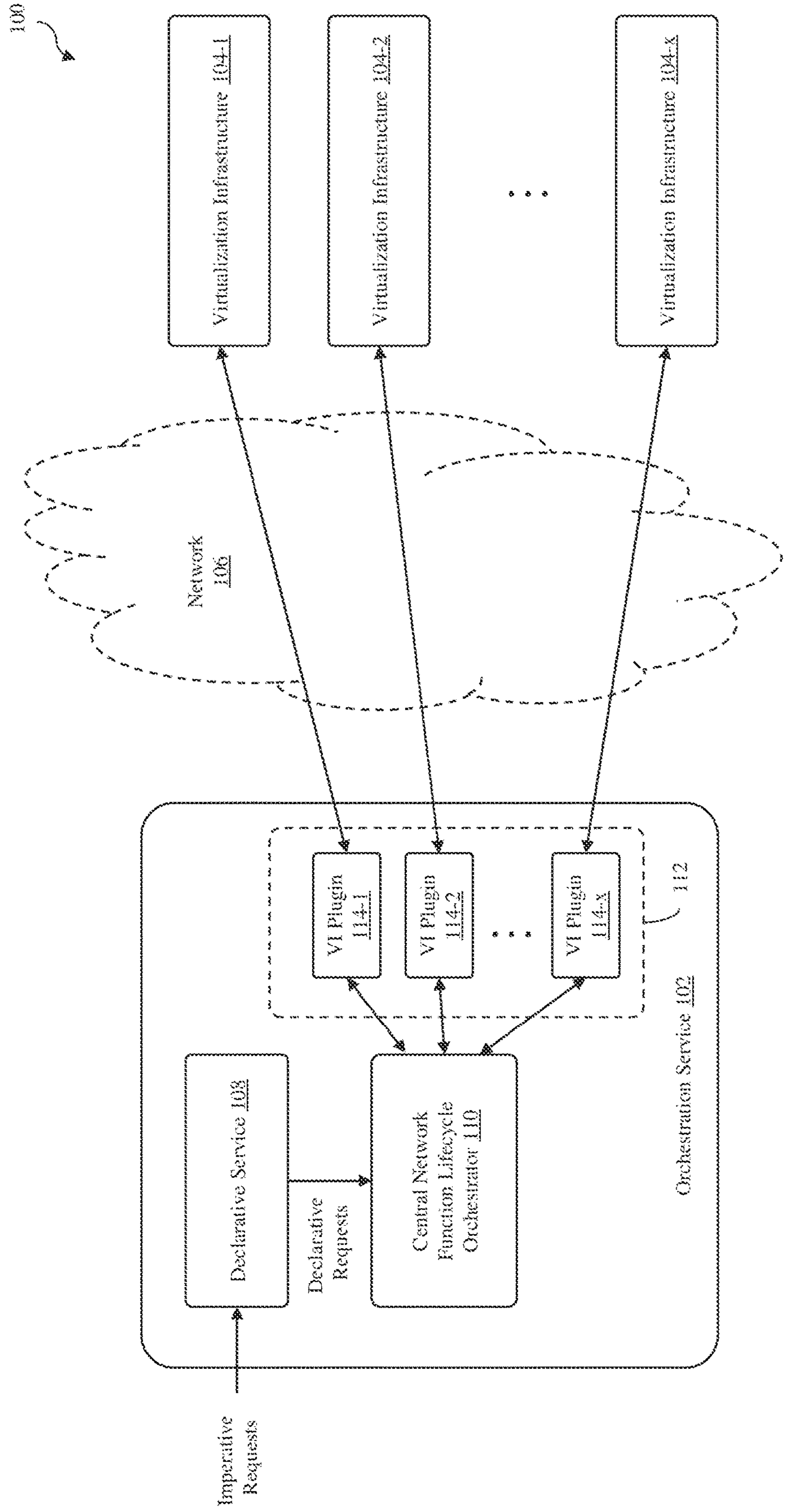
FIG. 1 is a block diagram of a distributed computing system with an orchestration service and multiple virtual infrastructures in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments in accordance with the invention address the following challenges. First, when it comes to seamlessly deploying network functions (NFs), which include cloud-based network functions (CNFs) and virtual network functions (VNFs), and managing them, there is currently no one-stop solution. Typically, the telecommunications company (telco) administrators want their NFs to be deployed as per the intended configurations and maintained in intended state with little to no manual intervention. Also, users want to be able to deploy large number of NFs quickly and in-parallel on any multi-cloud, multi-tenant environment, or hybrid environment. However, there is no orchestrator that can do this today. Second, some users want to deploy CNFs/VNFs in hybrid clouds, which bring the flexibility to choose the best tools from the best platform. However, there is no orchestrator which supports hybrid cloud deployment of CNFs/VNFs in a declarative way. Third, European Telecommunications Standards Institute (ETSI) SOL standard application programming interfaces (APIs) are imperative in nature which need more user intervention compared to the declarative API's.

Turning now to FIG. 1, a distributed computing system 100 in accordance with an embodiment of the invention is illustrated. As shown in FIG. 1, the distributed computing system 100 includes an orchestration service 102 that is connected to a plurality of virtual infrastructures 104 (i.e., virtual infrastructures 104-1, 104-2, . . . 104) through a communications network 106, which may be any communication network, such as the Internet. The virtual infrastructures 104 are cloud computing environments that offer compute, storage and network as resources for hosting or deployment of services or applications. These cloud computing environments may be private and/or public clouds. Thus, the virtual infrastructures 104 may form a multi-cloud computing environments, which may include both private and public clouds. As an example, the cloud computing environments may include Google Cloud Platform (GCP), Amazon Web Services (AWS), VMware Cloud on AWS, and on-prem VMware vSphere software-defined data center (SDDC).

The virtual infrastructures 104 are designed and implemented to support VNFs and CNFs, which are sometimes referred to as Containerized Network Functions. As an example, some of the virtual infrastructures 104 may be VM-based virtual infrastructures that support VNFs, while some of the virtual infrastructures may be container-based virtual infrastructures that support CNFs. A VNF is a virtualization of a network function that can run in a hypervisor environment, which is realized as a virtual machine. A CNF is a containerized application that provides network function virtualization (NFV) capability. VNFs and CNFs can be used to deploy distributed operations, such as network service operations, in the distributed computing system 100. Thus, these distributed operations may require one or more VNFs and one or more CNFs, which may be deployed and managed in the various virtual infrastructures 104.

Figure 2:
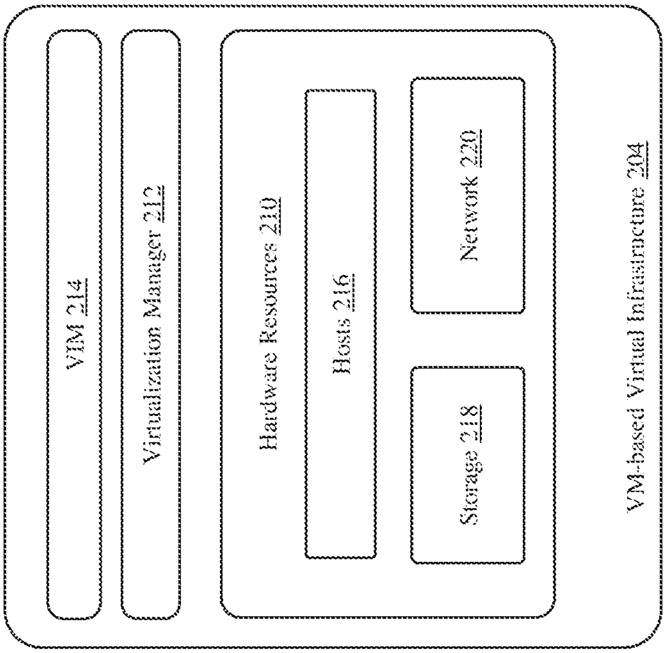
FIG. 2 illustrates an example of a virtual machine-based virtual infrastructure in accordance with an embodiment of the invention, which can be one of the virtual infrastructures in the distributed computing system shown in FIG. 1.

An example of a VM-based virtual infrastructure 204 in accordance with an embodiment of the invention, which can be one of the virtual infrastructures 104 in the distributed computing system 100, is shown in FIG. 2. The VM-based virtual infrastructure 204 includes hardware resources 210, a virtualization manager 212 and a VIM 214. The hardware resources 210 includes host computers (hosts) 216, physical storage resources 218 and physical network resources 220, which may be provided by a cloud provider if the VM-based virtual infrastructure is deployed in a public cloud. Each of the hosts 216 includes hardware commonly found on a server grade computer, such as CPU, memory, network interface card and one or more storage devices. In addition, each host includes a virtualization layer that abstracts processor, memory, storage, and networking resources of the host's hardware into virtual machines that run concurrently on the host. The virtual machines can then be used to run VNFs. In an embodiment, the virtual machines run on top of a hypervisor that enables sharing of the hardware resources of the host by the virtual machines. One example of a hypervisor may be used in the hosts is a VMware ESXi™ hypervisor provided as part of the VMware vSphere® solution made commercially available from VMware, Inc. The hypervisor of each host may run on top of the operating system of the host or directly on hardware components of the host.

The virtualization manager 212 is a virtualization management software, which is executed in a physical or virtual server, that cooperates with hypervisors installed in the hosts 216 to provision virtual compute, storage and network resources, including virtual machines, from the hardware resources 210. The VIM 214 is a virtualized infrastructure management software, which is executed in a physical or virtual server, that partitions the virtual compute, storage and network resources provisioned by the virtualization manager 212 for different tenants. The VIM 214 also exposes functionalities for managing the virtual compute, storage and network resources, e.g., as a set of application programming interfaces (APIs). Thus, the VIM 214 also exposes functionalities for managing VNFs running in the VMs in the VM-based virtual infrastructure 204.

Figure 3:
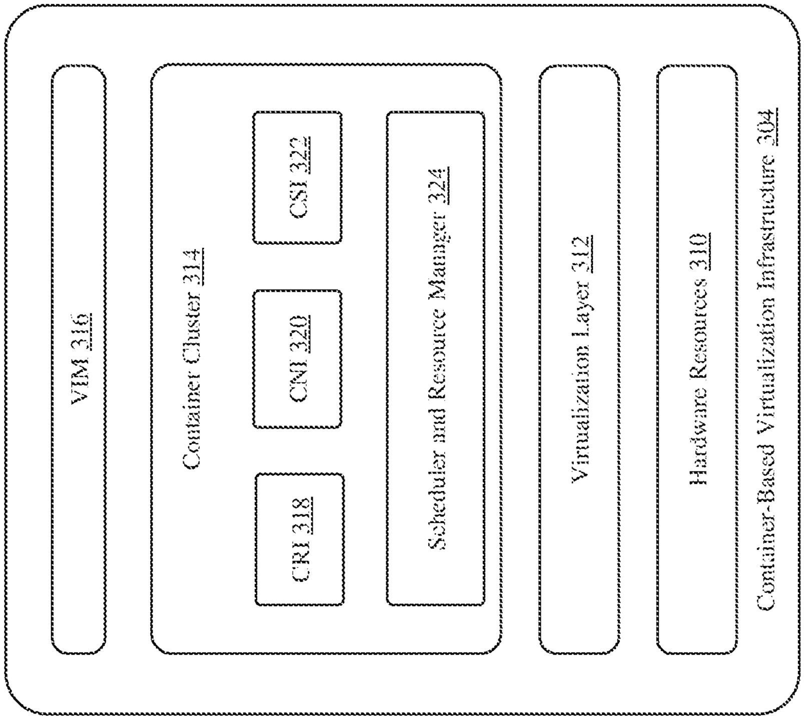
FIG. 3 illustrates an example of a container-based virtual infrastructure in accordance with an embodiment of the invention, which can be one of the virtual infrastructures in the distributed computing system shown in FIG. 1.

An example of a container-based virtual infrastructure 304 in accordance with an embodiment of the invention, which can be one of the virtual infrastructures 104 in the distributed computing system 100, is shown in FIG. 3. The container-based virtual infrastructures 304 includes hardware resources 310, an optional virtualization layer 312, a container cluster 314 and a virtual infrastructure manager (VIM) 316. The hardware resources 310 include compute, network and storage resources, which may be provided by a cloud provider, to support containers deployed in the container-based virtual infrastructure 304. The containers can then be used to run CNFs. The optional virtualization layer 312 is virtualization software to provision virtual compute, storage and network resources for containers used in the container cluster 314 from the hardware resources 310. In some implementations, the container cluster 314 may run on bare metal.

In the illustrated embodiment, the container cluster 314 includes a container runtime interface (CRI) 318, a container network interface (CNI) 320 and a container storage interface (CSI) 322 that provide compute, network and storage resources for containers in the cluster. The container cluster 314 also includes a scheduler and resource manager 324 that controls resources for the containers in the cluster through policies and topology awareness. The container cluster 314 can be any type of a container cluster, such as Kubernetes (K8S) cluster or a Docker Swarm.

The VIM 316 is a virtualized infrastructure management software, which is executed in a physical or virtual server, that partitions the virtual compute, storage and network resources. The VIM 316 also exposes functionalities for managing the virtual compute, storage and network resources, e.g., as a set of application programming interfaces (APIs). Thus, the VIM 316 also exposes functionalities for managing CNFs running in the containers in the container-based virtual infrastructure 304.

In some embodiments, the container-based virtual infrastructure 304 may use one or more of the available package manager and continuous deployment tools, such as Helm, Argo, Kustomize and Spinmaker. In these embodiments, information regarding a target virtual infrastructure may need to be applied via K8s Custom Resource (CR).

Turning back to FIG. 1, in a particular implementation, the distributed computing system 100 may be a telecommunication network, such as a 5G network, where the virtual infrastructures 104 provide network services to end users. The virtual infrastructures 104 may be deployed in different data centers, such as core data centers, regional data centers and edge data centers. Some of these data centers may include both types of the virtual infrastructures 104 to support VNFs and CNFs. In this implementation, the deployed VNFs and CNFs may provide services or functions that support network services. Examples of these services or functions include, but not limited to, User Plane Function (UPF), Enhanced Packet Core (EPC), IP Multimedia Subsystem (IMS), firewall, domain name system (DNS), network address translation (NAT), network edge, and many others. To achieve the speed and latency goals of 5G networks, some of these functions, such as UPF, need be deployed as close to the end users as possible.

The orchestrator service 102 of the distributed computing system 100 provides a main management interface for users. As illustrated, the orchestrator service 102 comprises a declarative service 108, which operates to transform imperative requests, e.g., imperative lifecycle APIs, to declarative requests, e.g., declarative lifecycle K8s APIs or CR, and apply them to a central network function lifecycle orchestrator 110, which can automatically manage the lifecycle of NFs (CNFs/VNFs) using lifecycle management operations, such as Heal, Scale, Upgrade and Termination. In an embodiment, the imperative requests may be ETSI SOL APIs, and thus, the orchestrator service 102 is able to handle APIs that meet the SOL standards of ETSI, such as SOL-003 specification. In addition, the orchestrator service 102 operates to transform events, e.g., K8s CRs, from the virtual infrastructures 104 to imperative responses. The transformation executed by the declarative service 108, which functions as a transformation engine to basically transform HOW to WHAT. Imperative requests, such as APIs, will tell the system HOW to achieve and the declarative service 108 will transform that to WHAT based on standards, such as SOL standards, and the underlying operator doing the actual execution. In the same way, the declarative service 108 will keep responding to imperative requests, such as APIs, as imperative responses based on the current state of the system, e.g., K8s events/CRs.

Examples of imperative requests that can be transformed into declarative requests include:

```
POST /ns_instances/
POST /ns_instances/{ns_instanceId}/Instantiate
POST /ns_instances/{ns_instanceId}/scale
POST /ns_instances/{ns_instanceId}/heal
```

As shown in FIG. 1, the central network function lifecycle orchestrator 110 is able to communicate with the different virtual infrastructures 104 using a set 112 of virtual infrastructure (VI) plugins 114 (e.g., VI plugins 114-1, 114-2, . . . , **114-*x*). Each VI plugin is specific to a particular virtualization infrastructure. As an example, the VI plugin 112-1 may be a Google Kubernetes Engine (GKE) plugin, where the virtualization infrastructure 104-1 is a GCP cloud. As another example, the VI plugin 112-2 may be an Azure Kubernetes Service (AKS) plugin, where the virtualization infrastructure 104-2 is an Azure cloud. As another example, the VI plugin 112-*x* may be an Amazon Elastic Kubernetes Service (EKS) plugin, where the virtualization infrastructure 104-2 is an AWS cloud. For some virtualization infrastructures, the central network function lifecycle orchestrator 110** may be able to communicate directly without the need for VI plugins for those virtualization infrastructures.

Figure 4:
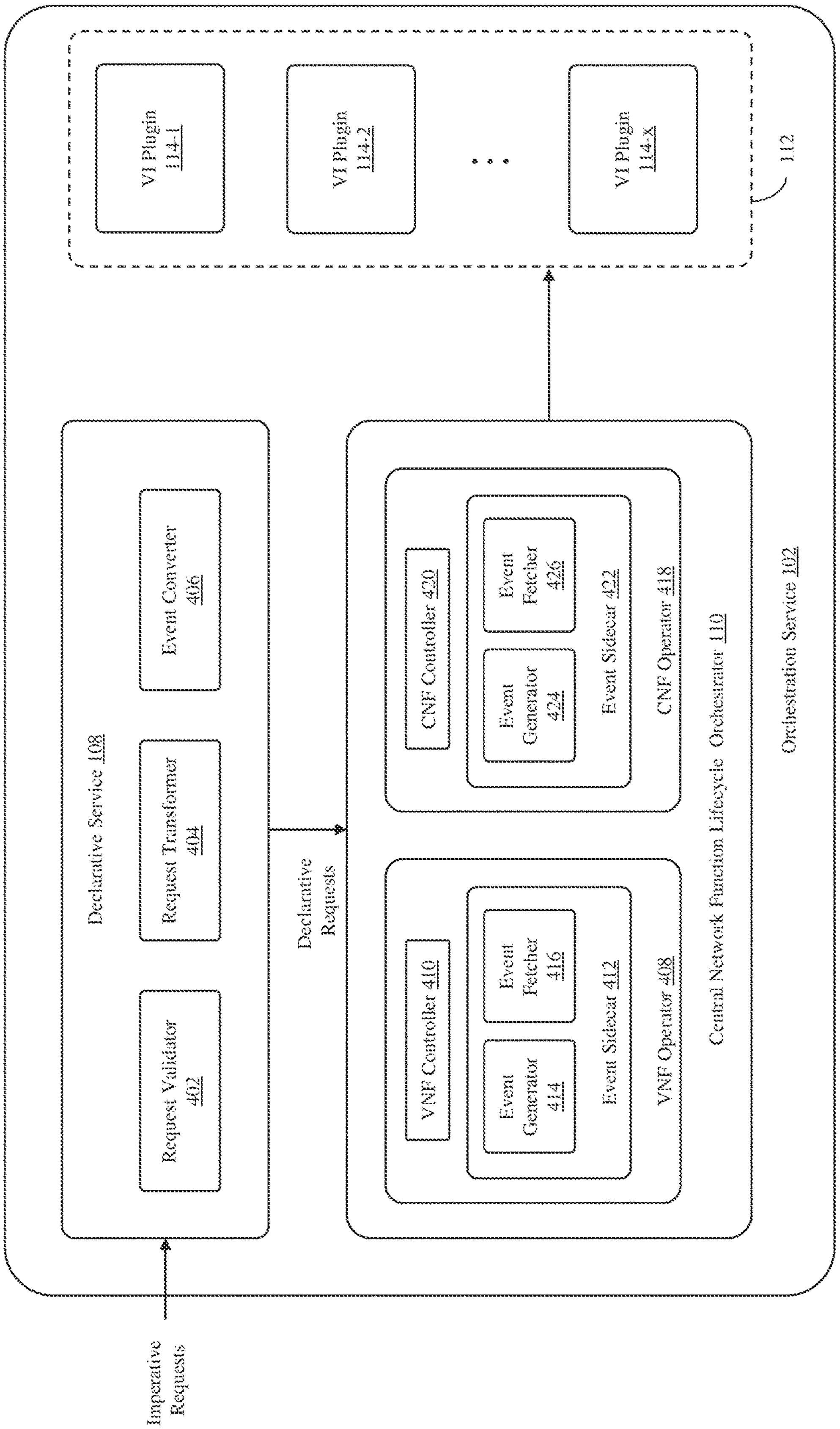
FIG. 4 is a block diagram of components of a declarative service and a central network function lifecycle orchestrator of the orchestrator service in accordance with an embodiment of the invention.

Turning now to FIG. 4, components of the declarative service 108 and the central network function lifecycle orchestrator 110 in accordance with an embodiment of the invention are shown. As shown in FIG. 4, the declarative service 108 includes a request validator 402, a request transformer 404 and an event converter 406. The request validator 402 is configured or programmed to check each imperative lifecycle request, e.g., an SOL API, to validate the imperative lifecycle request. The request transformer 404 is configured or programmed to transform the received imperative lifecycle request to a declarative lifecycle request, e.g., a declarative lifecycle API or K8s CR, which is transmitted to a target virtual infrastructure. Examples of declarative lifecycle APIs include, but not limited to, Heal, Scale, Upgrade and Termination APIs. The event converter 406 is configured or programmed to handle requests for events, such as subscriptions and operations, from users via a user interface for the orchestration service 102. The event converter 406 operates to convert events retrieved from the virtual infrastructures 104 (which may be stored in events cache) to imperative responses, which are then provided to the requesting users.

As also shown in FIG. 4, the central network function lifecycle orchestrator 110 includes a VNF operator 408, which has a VNF controller 410 and an event sidecar 412. The VNF controller 410 is configured or programmed to receive the declarative requests from the request transformer 404 of the declarative service 108 and apply the declarative requests to the target virtual infrastructures 104 using or not using the VI plugin 114, depending on the target virtual infrastructures, to execute various lifecycle management operations for the VNFs running in the target virtual infrastructures. For certain operations, the VNF controller 410 may receive events from the target virtual infrastructures 104, which are then used to execute some of the VNF lifecycle management operations, such as auto heal and scale reconcile operations. The event sidecar 412, which includes an event generator 414 and an event fetcher 414, is configured to handle events that occur in the virtual infrastructures 104. The events from the virtual infrastructures 104 are fetched by the event fetcher 414, which may communicate with virtual infrastructures using the VI plugins 114. In one implementation, the event fetcher may retrieve VNF health information from target virtual infrastructures using ETSI monitoring APIs. As noted above, some of the fetched events may be sent to the VNF controller 410 so that the VNF controller can use them to execute certain VNF lifecycle management operations. Some or all of the fetched events may be sent to the event generator 414, which generates events in a format suitable for the virtual infrastructures 104, such as K8s events.

One of the VNF lifecycle management operations that is performed by the VNF controller 410 is VNF migration, which is usually regarded as a means to optimize and improve the service performance in NFV-enabled networks. For example, when physical nodes and physical links connecting the nodes are overloaded, VNFs on these nodes and the traffic on these links may need to be migrated so that their burden could be eased. The physical nodes may be the host computers in the virtual infrastructures 104 running the virtual machines, which are running the VNFs. In an embodiment, the VNF controller will listen to the performance metrics, e.g., key performance indicators (KPIs), of the VNFs and automatically decide and execute migration of VNF's based on the monitored performance metrics. VNF migration may be executed by the VNF controller 410 when a physical node in one of the virtual infrastructures 104 is overloaded, as described below.

Figure 5:
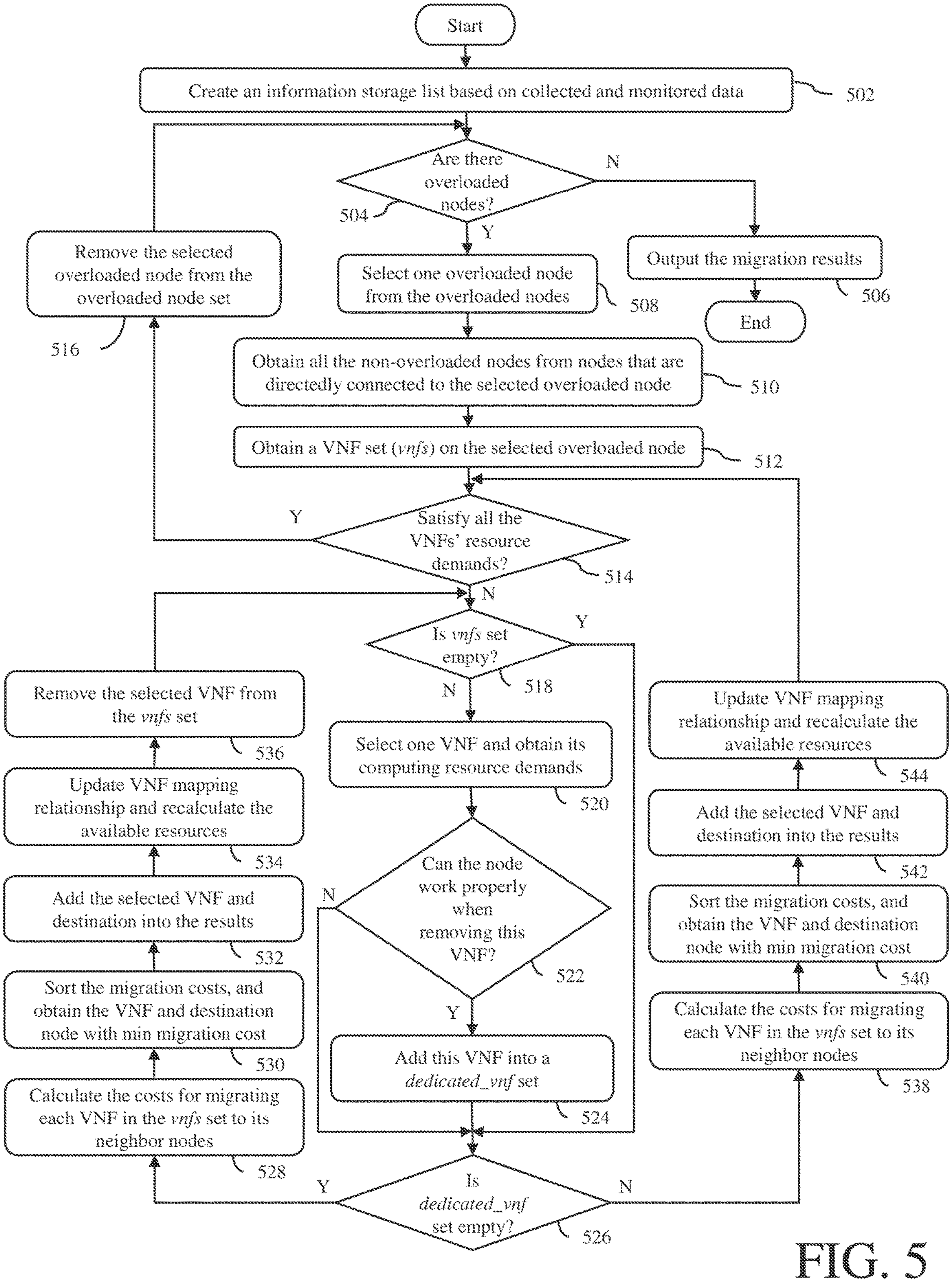
FIG. 5 is a flow diagram of a process of executing a node overload virtual network function (VNF) migration by a VNF controller of the central network function lifecycle orchestrator in accordance with an embodiment of the invention.

A process of executing a node overload VNF migration by the VNF controller 410 of the central network function lifecycle orchestrator 110 in accordance with an embodiment of the invention is described with reference to a process flow diagram of FIG. 5. This process may be performed for one or more of the virtual infrastructures 104 in the distributed computing system 100. The node overload migration process begins at step 502, where an information storage list is created based on collected and monitored data. The storage list includes monitoring data of the VNFs, which is extracted periodically. If there are physical nodes that cannot satisfy the computing resource requirements of all VNFs on it, a node aware VNF migration mechanism is invoked to ease the burden of the overloaded nodes. Next, at step 504, a determination is made whether there are overloaded nodes. If there are no overloaded nodes, then the migration results are outputted, which indicate that here are no overloaded nodes at this time, at step 506, and the process comes to an end.

However, if there are overloaded nodes, then one overloaded load is selected from the overloaded nodes, at step 508. In an embodiment, one of the overloaded loads may be randomly selected from the overloaded nodes. Next, at step 510, all the non-overloaded nodes are obtained from nodes that are directly connected to the selected overloaded node. Next, at step 512, a VNF set (vnfs) on the selected overloaded node is obtained. The VNF set or vnfs for a node is a list of VNFs running on that node.

Next, at step 514, a determination is made whether the selected overloaded node can satisfy all the resource demands of the VNFs running on the selected overloaded node. If the selected overloaded node can satisfy all the VNFs', then the selected overloaded node is removed from the overloaded node set, at step 516. The process then proceeds back to step 504. However, if the selected overloaded node cannot satisfy all the VNFs', a determination is made whether the vnfs set is empty, at step 518. If yes, then the process proceeds to step 526. If no, one VNF is selected from the vnfs set and its computing resource demand is obtained, at step 520.

Next, at step 522, a determination is made whether the node can work properly when removing the selected VNF. If no, then the process proceeds to step 526. If yes, the selected VNF is added into a dedicated_vnf set, which is a list of VNFs that can be removed from the node, at step 524. The process proceeds to step 526.

At step 526, a determination is made whether dedicated_vnf set is empty. If the dedicated_vnf is empty, the costs for migrating each VNF in the vnfs set to its neighbor nodes are calculated, at step 528. Next, at step 530, the migration costs are sorted and the VNF and destination node with minimum migration cost is obtained.

Next, at step 532, the selected VNF and destination node are added into the results. Next, at step 534, VNF mapping relationship (i.e., VNFs and their corresponding destination nodes) is updated, and the available resources are recalculated. Next, at step 536, the selected VNF is removed from the vnfs set. The process then proceeds back to step 518.

Going back to step 526, if the dedicated_vnf set is not empty, the costs for migrating each VNF in the dedicated_vnf set to its neighbor nodes are calculated, at step 538. Next, at step 540, the migration costs are sorted, and the VNF and destination node with minimum migration cost is obtained.

Next, at step 542, the selected VNF and destination node are added into the results. Next, at step 544, the VNF mapping relationship is updated, and the available resources are recalculated. The process then proceeds back to step 514.

In addition to VNF migration due to physical node overload situations, VNF migration may be executed by the VNF controller 410 when physical links between nodes are overloaded. VNF migration executed by the VNF controller 410 due to physical link overload situations is described below.

Figure 6:
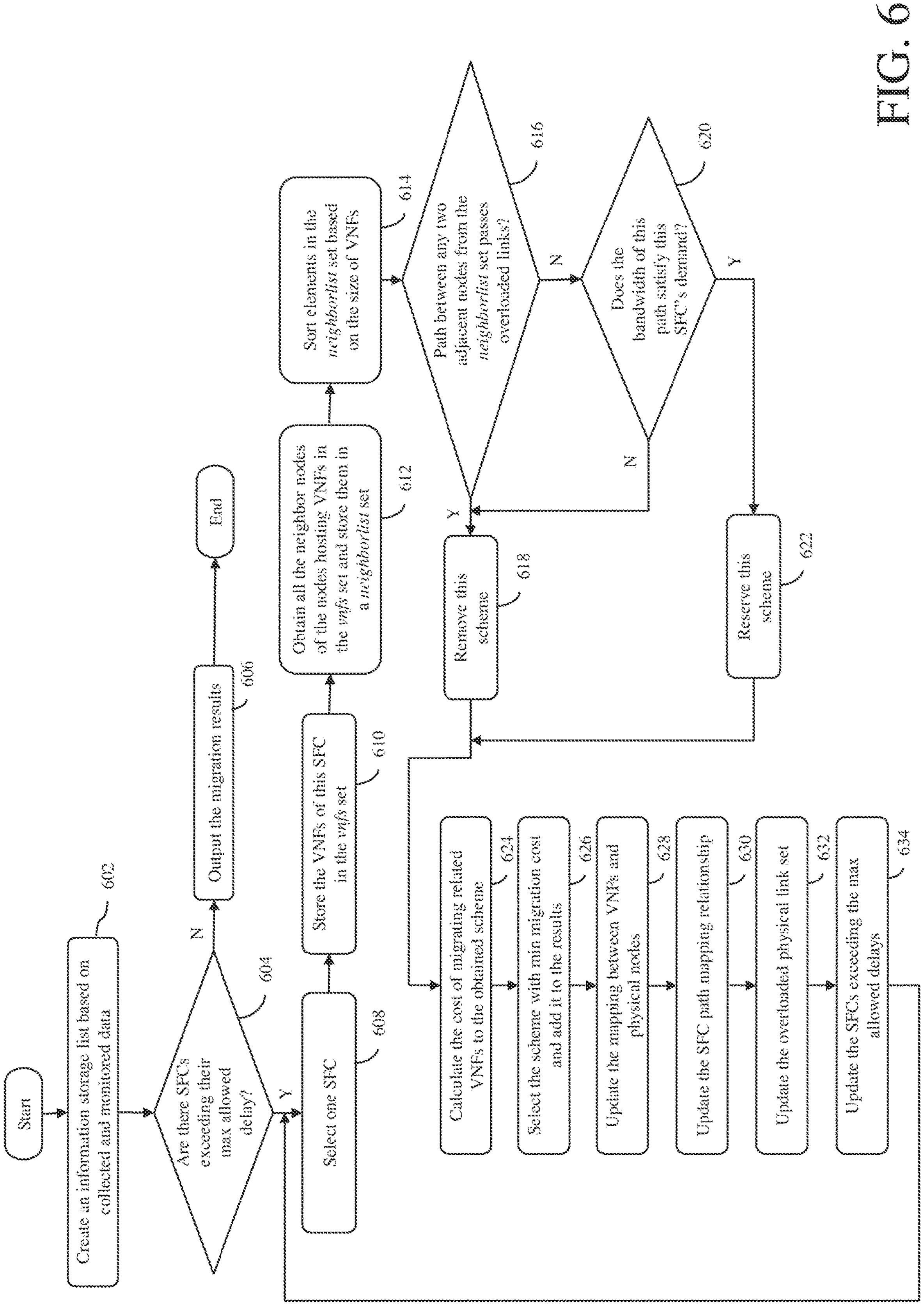
FIG. 6 is a flow diagram of a process of executing a link overload VNF migration by the VNF controller of the central network function lifecycle orchestrator in accordance with an embodiment of the invention.

A process of executing a link overload VNF migration by the VNF controller 410 in accordance with an embodiment of the invention is described with reference to a process flow diagram of FIG. 6. The link overload VNF migration process begins at step 602, where the information storage list is created based on the collected monitored data. Next, at step 604, a determination is made whether there are service function chains (SFCs) that exceed their maximum allowed delays. If there are no SFCs that exceed their maximum allowed delays, then the obtained results are outputted, at step 606, and the process comes to an end.

However, if there are SFCs that exceed their maximum allowed delays, then one of the SFCs that exceed their maximum allowed delays is selected to be processed, at step 608. In an embodiment, the SFC to be processed may be randomly selected from the SFCs that exceed their maximum allowed delays. Next, at step 610, the VNFs of the SFC are stored in the vnfs set.

Next, at step 612, all the neighbor nodes of the nodes hosting VNFs in the vnfs set are obtained and stored in a neighborlist set. Next, at step 614, elements in the neighborlist set are sorted based on the size of the VNFs.

Next, at step 616, a determination is made whether the path between any two adjacent nodes from the neighborlist set passes overloaded links. If yes, then this scheme or current migration plan is removed, at step 618. The process then proceeds to step 624. However, if no, then a determination is made whether the bandwidth of this path satisfy this SFC's demand, at step 620. If no, the process proceeds to step 618, where the scheme is removed. If yes, then the scheme is reserved, at step 622. The process then proceeds to step 624.

At step 624, the cost of migrating related VNFs to the obtained scheme is calculated. Next, at step 626, the scheme with minimum migration cost is selected and added to the results. Next, at step 628, the mapping between the VNFs and physical nodes are updated.

Next, at step 630, the SPC path mapping relationship is updated. Next, at step 632, the overloaded physical link set is updated. Next, at step 634, the SFCs exceeding the maximum allowed delay are updated. The process then proceeds back to step 608.

Turing back to FIG. 4, the central network function lifecycle orchestrator 110 also includes a CNF operator 418, which has a CNF controller 420 and an event sidecar 422. Similar to the event sidecar 412 of the VNF operator 408, the event sidecar 422 includes an event generator 424 and an event fetcher 426. The CNF controller 420 is configured or programmed to receive the declarative requests, e.g., declarative APIs, and apply the declarative requests to execute various lifecycle management operations for CNFs running in the virtual infrastructures 104. For certain operations, the CNF controller 420 may receive events from the virtual infrastructures 104, which are then used to execute some of the CNF lifecycle management operations, such as auto heal and scale reconcile operations. The events from the virtual infrastructures 104 are fetched by the event fetcher 426, which communicates with CNF tools running in the different virtual infrastructures 104, such as Argo CD, Spinnaker and Helm. In one implementation, the event fetcher may retrieve CNF health information from target virtual infrastructures by communicating with Prometheus solutions. As noted above, some of the fetched events may be sent to the CNF controller 420 so that the CNF controller can use them to execute certain VNF lifecycle management operations. Some or all of the fetched events may be sent to the event generator, 424 which generates events in a format suitable for the virtual infrastructures, such as K8s events.

Figure 7A:
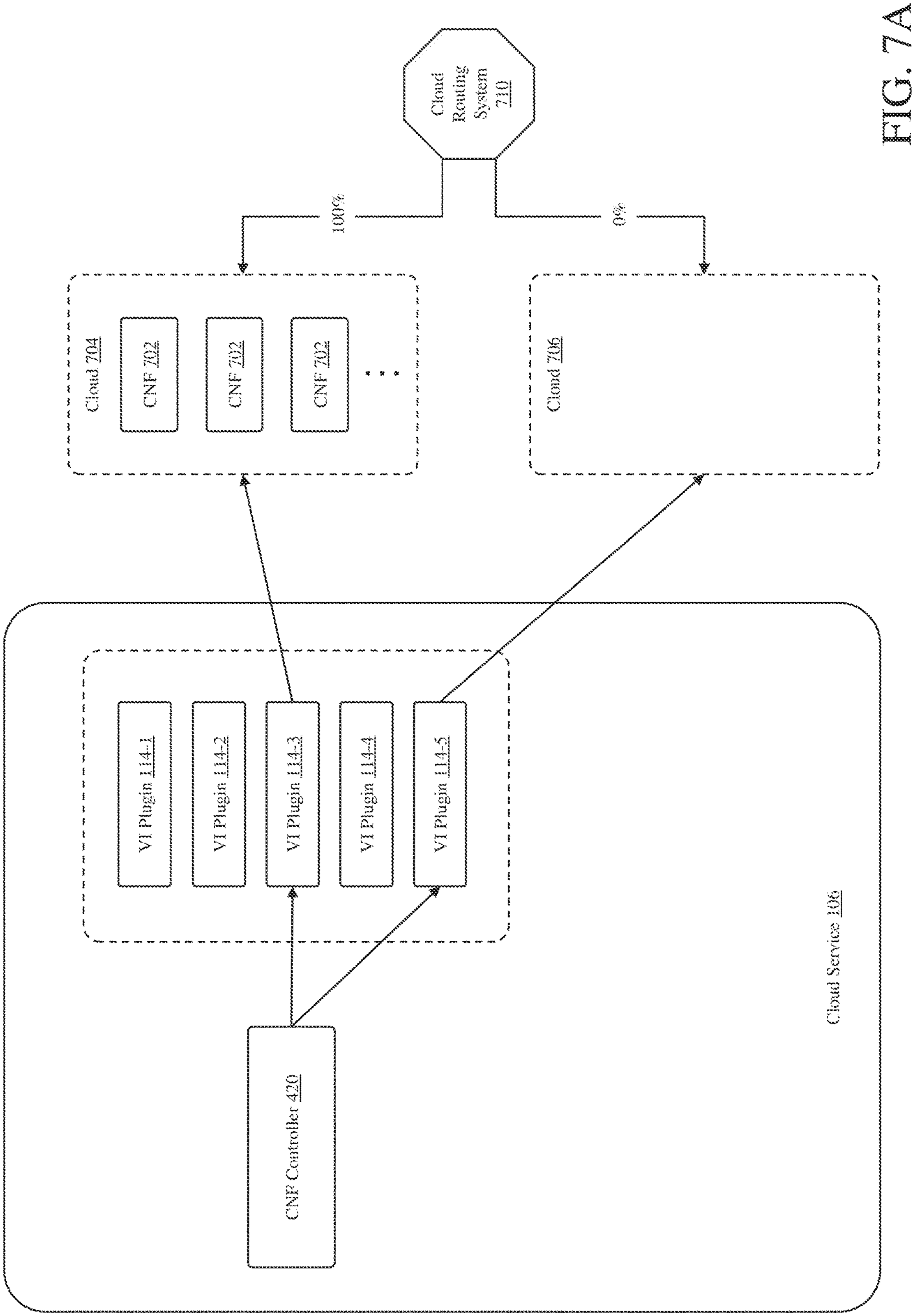
FIGS. 7A-7E show a cloud-native network function (CNF) migration solution executed by a CNF controller of the central network function lifecycle orchestrator in accordance with an embodiment of the invention.

In an embodiment, the CNF controller 420 uses cloud provider plugins, such as EKS, GKE or Tanzu Kubernetes Grid (TKG), so that users can simply deploy their CNF or NVF workloads. In addition, the CNF controller 420 enables zero-downtime CNF migration solution between public clouds. This CNF migration solution executed by the CNF controller is described below using an example, which is illustrated in FIGS. 7A-7E. In this example, as shown in FIG. 7A, there are a number of CNFs 702 running on a first virtual infrastructure or cloud 704, e.g., an AWS cloud, and the user wants to migrate these CNFs to a second virtual infrastructure or cloud 706, e.g., an Azure cloud. At this state, all the incoming traffic (100% of traffic) are routed to the CNFs 702 in the first cloud 704 via a cloud routing system 710. In an embodiment, the traffic may be controlled by instructing load balancers associated with the virtual infrastructures 104. The lifecycle of the CNFs 702 is being managed by the CNF controller 420 using the VI plugin 114-3. If the first cloud is a VMware cloud, the VI plugin 114-3 is a TKG plugin.

Figure 7B:
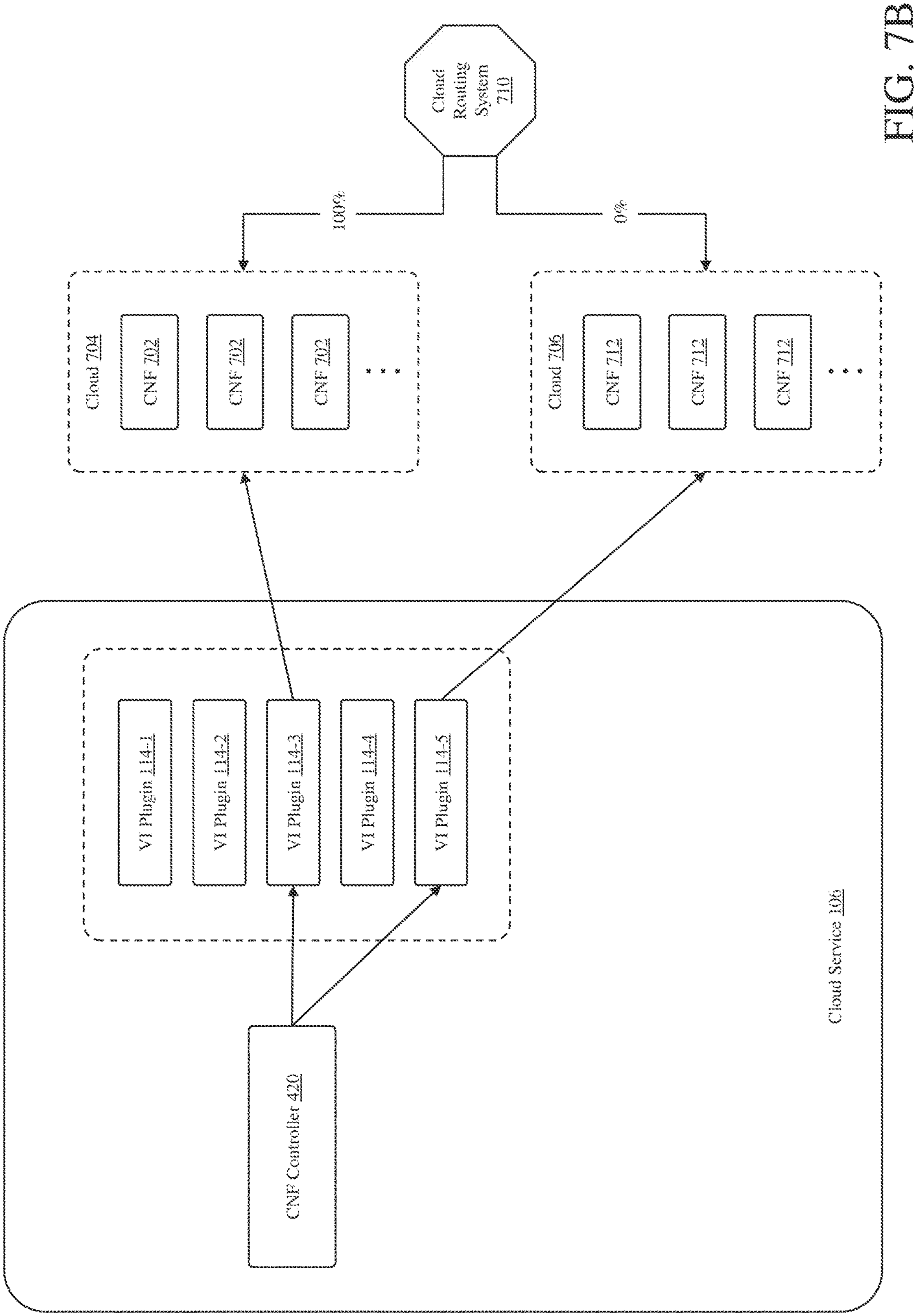

First, in order to migrate the CNFs 702 in the first cloud 704, a number of CNFs 712 are deployed to the second cloud 706 by the CNF controller 420 using a VI plugin for the second cloud, i.e., the VI plugin 114-5, as illustrated in FIG. 7B. As an example, if the second cloud 706 is an AWS cloud, the VI plugin 114-5 for the second cloud is an EKS plugin. For this deployment, the same number of CNFs as in the first cloud 704 can be deployed in the second cloud 706.

Figure 7C:
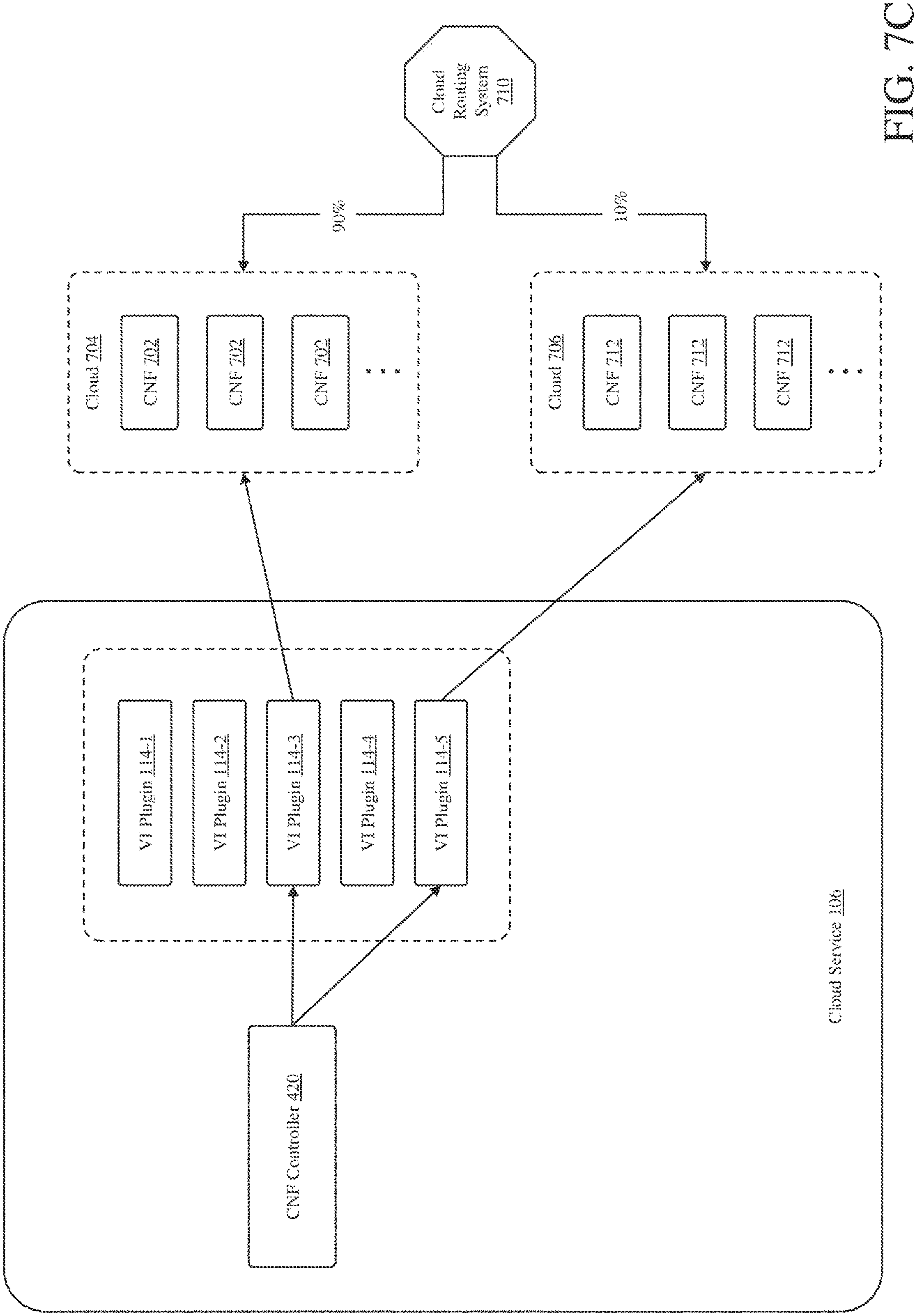
Figure 7D:
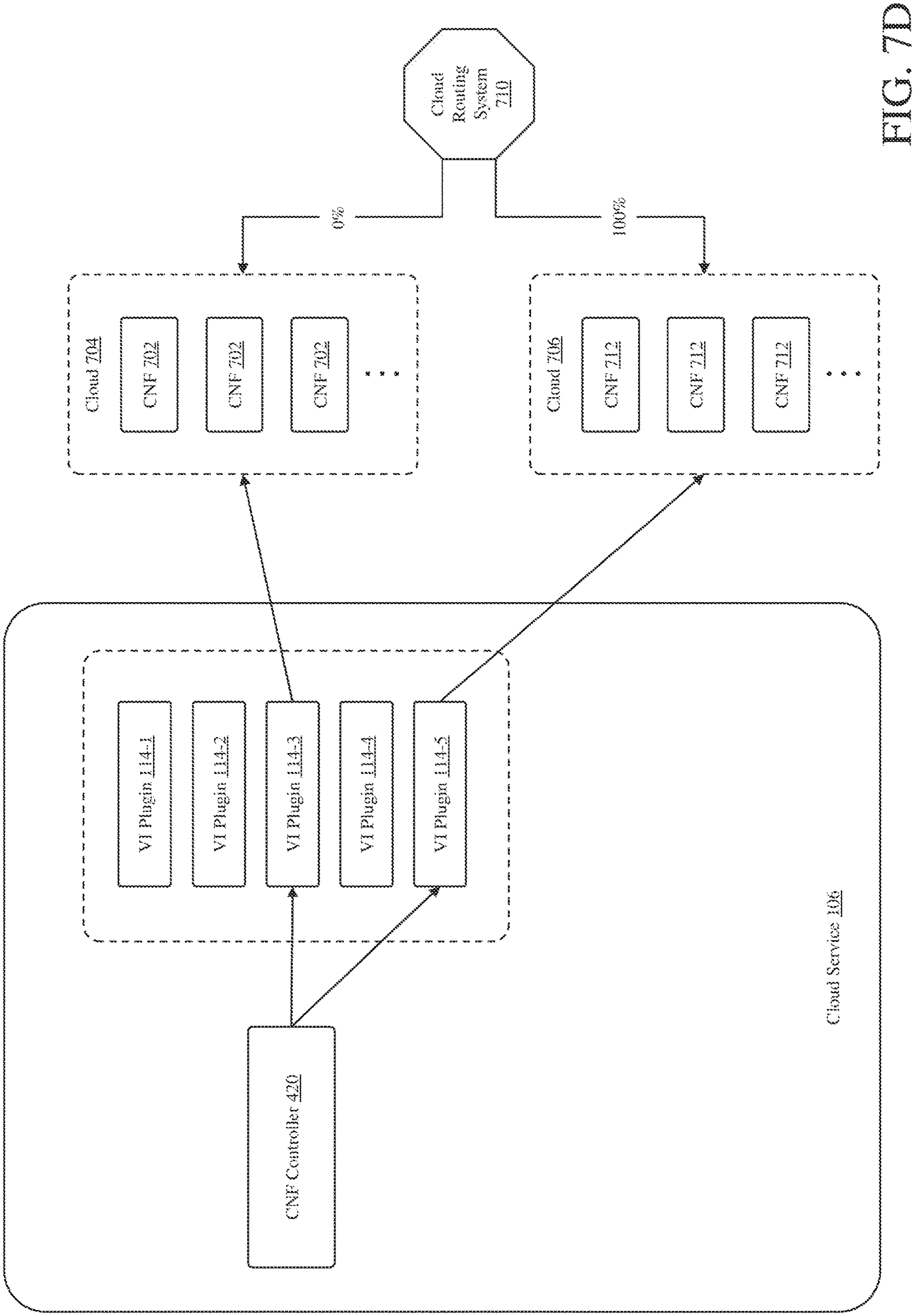
Figure 7E:
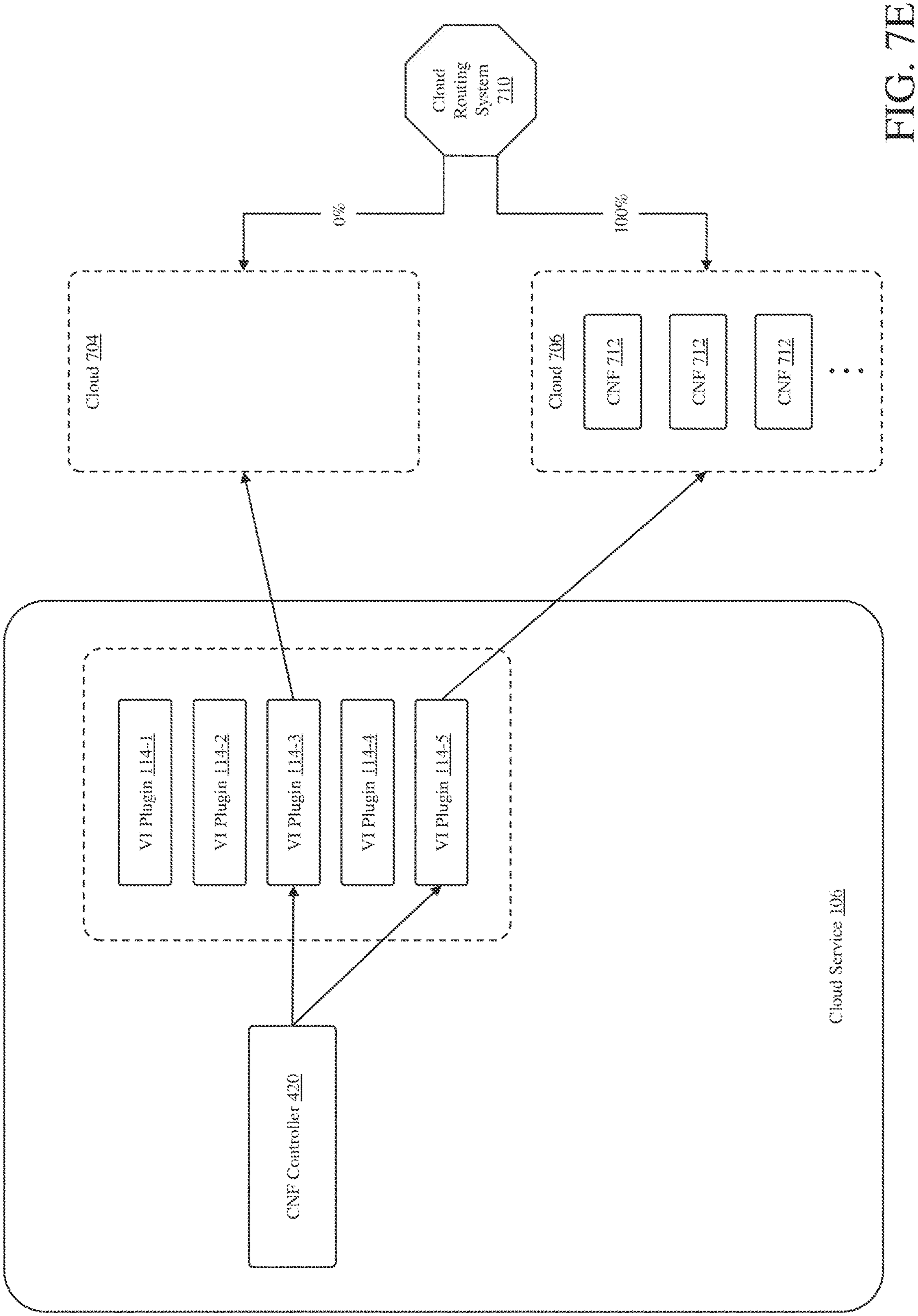

Once the CNFs 712 are properly deployed in the second cloud 706, the traffic coming to the CNFs 702 in the first cloud 704 may be slowly diverted or routed to the CNFs 712 in the second cloud 706 until all the traffic is routed to the CNFs 712 in the second cloud. As an example, initially, 10% of the traffic may be routed to the CNFs 712 in the second cloud 706, which means that 90% of the traffic is still routed to the CNFs 702 in the first cloud 704, as illustrated in FIG. 7C. Then, the traffic being routed to the CNFs 712 in the second cloud 706 can be increased to 20%, which means that 80% of the traffic is still routed to the CNFs 712 in the first cloud 704. This increase of traffic to the CNFs 712 in the second cloud 706 can be increased until 100% of the traffic is routed to the CNFs 712 in the second cloud 706, as illustrated in FIG. 7D. After all the traffic is routed to the CNFs 712 in the second cloud 706, the CNFs 702 in the first cloud 704 can be deleted, as illustrated in FIG. 7E.

Figure 8:
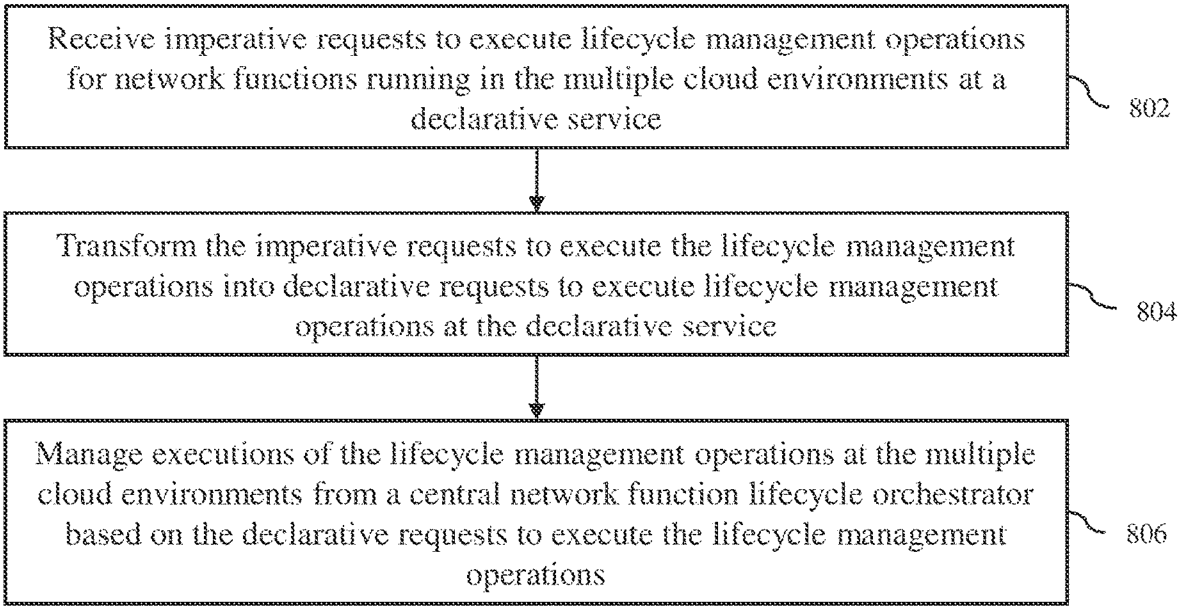
FIG. 8 is a process flow diagram of a computer-implemented method computer-implemented method for managing lifecycles of network functions in multiple cloud environments in accordance with an embodiment of the invention.

A computer-implemented method for managing lifecycles of network functions in multiple cloud environments in accordance with an embodiment of the invention is described with reference to a flow diagram of FIG. 8. At block 802, imperative requests to execute lifecycle management operations for network functions running in the multiple cloud environments are received at a declarative service. At block 804, the imperative requests to execute the lifecycle management operations are transformed into declarative requests to execute the lifecycle management operations at the declarative service. At block 806, executions of the lifecycle management operations at the multiple cloud environments are managed from a central network function lifecycle orchestrator based on the declarative requests to execute the lifecycle management operations.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing lifecycles of network functions in multiple cloud environments, the method comprising:

receiving, by a declarative service, imperative requests to execute lifecycle management operations for the network functions running in the multiple cloud environments;

transforming, by the declarative service, the imperative requests to execute the lifecycle management operations into declarative requests to execute the lifecycle management operations; and managing, by a central network function lifecycle orchestrator that receives the declarative requests from the declarative service, executions of the lifecycle management operations at the multiple cloud environments based on the declarative requests to execute the lifecycle management operations.

2. The computer-implemented method of claim 1, wherein the imperative requests include application programming interfaces (APIs) in accordance with a standard specification of European Telecommunications Standards Institute (ETSI).

3. The computer-implemented method of claim 1, wherein the declarative requests include Kubernetes Custom Resources.

4. The computer-implemented method of claim 1, wherein managing the executions of the lifecycle management operations at the multiple cloud environments includes managing the executions of the lifecycle management operations at the multiple cloud environments from the central network function lifecycle orchestrator using a virtual infrastructure plugin for at least some of the multiple cloud environments.

5. The computer-implemented method of claim 1, wherein at least one of the cloud environments is a virtual machine-based virtual infrastructure or a container-based virtual infrastructure.

6. The computer-implemented method of claim 1, wherein managing the executions of the lifecycle management operations at the multiple cloud environments includes executing a node overload virtual network function (VNF) migration by the central network function lifecycle orchestrator.

7. The computer-implemented method of claim 1, wherein managing the executions of the lifecycle management operations at the multiple cloud environments includes executing a link overload virtual network function (VNF) migration by the central network function lifecycle orchestrator.

8. The computer-implemented method of claim 1, wherein managing the executions of the lifecycle management operations at the multiple cloud environments includes migrating cloud-native network functions (CNFs) from a first cloud environment to a second cloud environment by the central network function lifecycle orchestrator.

9. The computer-implemented method of claim 8, wherein migrating the CNFs from the first cloud environment to the second cloud environment includes deploying new CNFs in the second cloud environment, gradually diverting traffic to the CNFs in the second cloud environment until there is no traffic to the CNFs in the first cloud environment, and removing the CNFs in the first cloud environment.

10. A non-transitory computer-readable storage medium containing program instructions for managing lifecycles of network functions in multiple cloud environments, wherein execution of the program instructions by one or more processors of a computer system causes the one or more processors to perform steps comprising:

receiving, by a declarative service, imperative requests to execute lifecycle management operations for the network functions running in the multiple cloud environments;

transforming, by the declarative service, the imperative requests to execute the lifecycle management operations into declarative requests to execute the lifecycle management operations; and managing, by a central network function lifecycle orchestrator that receives the declarative requests from the declarative service, executions of the lifecycle management operations at the multiple cloud environments based on the declarative requests to execute the lifecycle management operations.

11. The non-transitory computer-readable storage medium of claim 10, wherein the imperative requests include application programming interfaces (APIs) in accordance with a standard specification of European Telecommunications Standards Institute (ETSI).

12. The non-transitory computer-readable storage medium of claim 10, wherein the declarative requests include Kubernetes Custom Resources.

13. The non-transitory computer-readable storage medium of claim 10, wherein managing the executions of the lifecycle management operations at the multiple cloud environments includes managing the executions of the lifecycle management operations at the multiple cloud environments from the central network function lifecycle orchestrator using a virtual infrastructure plugin for at least some of the multiple cloud environments.

14. The non-transitory computer-readable storage medium of claim 10, wherein at least one of the cloud environments is a virtual machine-based virtual infrastructure or a container-based virtual infrastructure.

15. The non-transitory computer-readable storage medium of claim 10, wherein managing the executions of the lifecycle management operations at the multiple cloud environments includes executing a node overload virtual network function (VNF) migration by the central network function lifecycle orchestrator.

16. The non-transitory computer-readable storage medium of claim 10, wherein managing the executions of the lifecycle management operations at the multiple cloud environments includes executing a link overload virtual network function (VNF) migration by the central network function lifecycle orchestrator.

17. The non-transitory computer-readable storage medium of claim 10, wherein managing the executions of the lifecycle management operations at the multiple cloud environments includes migrating cloud-native network functions (CNFs) from a first cloud environment to a second cloud environment by the central network function lifecycle orchestrator.

18. The non-transitory computer-readable storage medium of claim 17, wherein migrating the CNFs from the first cloud environment to the second cloud environment includes deploying new CNFs in the second cloud environment, gradually diverting traffic to the CNFs in the second cloud environment until there is no traffic to the CNFs in the first cloud environment, and removing the CNFs in the first cloud environment.

19. A system comprising:

memory; and at least one processor configured to:

receive, by a declarative service, imperative requests to execute lifecycle management operations for network functions running in multiple cloud environments;

transform, by the declarative service, the imperative requests to execute the lifecycle management operations into declarative requests to execute the lifecycle management operations; and manage, by a central network function lifecycle orchestrator that receives the declarative requests from the declarative service, executions of the lifecycle management operations at the multiple cloud environments based on the declarative requests to execute the lifecycle management operations.

20. The system of claim 19, wherein the imperative requests include application programming interfaces (APIs) in accordance with a standard specification of European Telecommunications Standards Institute (ETSI) and the declarative requests include Kubernetes Custom Resources.

* * * * *